Patented July 26, 1949

2,477,426

UNITED STATES PATENT OFFICE 2,477,426

PREPARATION OF 2-AMINO-4-HYDROXY-6-METHYL PTERIDINE

Joseph Semb, New City, N. Y., assignor to American Cyanamid Company, New York, N. Y., a corporation of Maine No Drawing. Application June 4, 1948, Serial No. 31,217

6 Claims. (Cl. 260—251)

This invention relates to an improved method of preparing 2-amino-4-hydroxy-6-methyl pteridine. This compound can also be named 2-amino-4-hydroxy-6-methylpyrimido-[4,5-b]pyrazine.

In the co-pending application of John H. Mowat, Serial No. 633,870, filed December 8, 1945, now Patent No. 2,443,078, a description of 2-amino-4-hydroxy-6-methylpyrimido[4,5-b]pyrazine and its preparation is given. This compound is prepared by reacting 2,4,5-triamino-6-hydroxy-pyrimidine with methyl-gamma,gamma-dimethoxy acetoacetate to obtain an intermediate product which is decarboxylated to give the compound desired. Other methods have been developed for the preparation of this compound such as by the reaction of 2,4,5-triamino-6-hydroxypyrimidine with methyl glyoxal. However, in these methods a second product, 2-amino-4-hydroxy-7-methyl pteridine, is also obtained to some extent. Only the 2-amino-4-hydroxy-6-methyl pteridine can be used as an intermediate to obtain folic acid. The 2-amino-4-hydroxy-7-methyl pteridine is therefore an undesirable side reaction product, the formation of which tends to lower the yield of the desired 2-amino-4-hydroxy-6-methyl pteridine.

I have found that 2-amino-4-hydroxy-6-methyl pterdine can be produced in excellent yields by reacting 2,4,5-triamino-6-hydroxypyrimidine or a salt thereof with methyl glyoxal in the presence of the $SO_3^-$ ion at a pH less than 8.5. The product obtained under these conditions is almost entirely the 6-substituted isomer. The $SO_3^-$ ion is most easily supplied by the addition of an alkali metal, alkaline earth metal or ammonium sulfite or bisulfite to the reaction mixture.

The intermediates 2,4,5-triamino-6-hydroxy-pyrimidine and methyl glyoxal are known compounds and may be prepared by methods which have been described in the chemical literature. In addition to methyl glyoxal, acetals thereof may be used in the process such as methyl glyoxal dimethyl acetal, methyl glyoxal diethyl acetal, methyl glyoxal dipropyl acetal, methyl glyoxal diisopropyl acetal, methyl glyoxal dibutyl acetal and the like. However, I believe that in any event the reaction which takes place is between methyl glyoxal and the triamine.

The reaction may be carried out at temperatures within the range of from about 0° C. up to about 100° C.

In carrying out the reaction a substantially aqueous solvent is used. Mixtures of water and water miscible solvents such as lower aliphatic alcohols, dioxane, and the like can also be used.

As stated above the intermediate prepared in the present invention is useful in the preparation of pteroylglutamic acid and peptides thereof. To prepare these compounds the intermediate is first halogenated and then reacted with para-aminobenzoylglutamic acid or a peptide thereof.

A number of experiments were carried out in which 2,4,5-triamino-6-hydroxypyrimidine was reacted with methyl glyoxal at a pH varying from 3 to 9 and in the presence or absence of the $SO_3^-$ ion. When 2.14 g. of 2,4,5-triamino-6-hydroxypyrimidine is reacted with 2.6 g. of 30% methyl glyoxal in 200 cc. of water at a pH of 3 in the presence of the $SO_3^-$ ion a product is obtained which is predominately 2-amino-4-hydroxy-6-methyl pteridine as shown by spectrographic analysis. Another experiment carried out at a pH of 5 under the same conditions, gave similar results. However, it was found that if the $SO_3^-$ ion was not present under these conditions the product obtained was predominately the 7-methyl isomer. Other experiments carried out at a pH of 7, 8 and 8.5 in the presence of the $SO_3^-$ ion showed the product obtained was 2-amino-4-hydroxy-6-methyl pteridine. Nevertheless, under these same conditions in the absence of the $SO_3^-$ ion most of the product was the 7-methyl isomer. Other experiments were conducted under the conditions given above at a pH of 9 both in the presence and the absence of the $SO_3^-$ ion. It was found that under either conditions the product obtained was predominately 2-amino-4-hydroxy-7-methyl pteridine.

In accordance with the group of experiments carried out above in order to obtain predominately 2-amino-4-hydroxy-6-methyl pteridine from the reaction of 2,4,5-triamino-6-hydroxy-pyrimidine and methyl glyoxal the pH is less than 8.5 and the $SO_3^-$ ion is present.

The following examples illustrate the method of the present invention in greater detail.

Example 1

A solution of 30 g. of sodium sulfite in 90 ml. of water is prepared and the pH adjusted to 7. To this is added a solution of 2.14 g. of 2,4,5-triamino-6-hydroxypyrimidine dihydrochloride in a small amount of water. The mixture is heated on a steam bath to about 98° C. and over a period of 5 minutes 2.35 ml. of 30.7% methyl glyoxal dissolved in 7 ml. of water containing 1 g. of sodium bisulfite is added. The mixture is cooled to room temperature, filtered and the precipitate washed with water and ethanol. A yield of 1.5 g. of product is obtained which on spectroscopic analysis is predominately 2-amino-4-hydroxy-6-methylpyrimido[4,5-b]pyrazine.

*Example 2*

A solution of 30 g. of sodium sulfite in 90 ml. of water is prepared and the pH adjusted to 7. To this is added 2.14 g. of 2,4,5-tri-amino-6-hydroxypyrimidine dihydrochloride dissolved in a small amount of water. The pH is again adjusted to 7 and the mixture placed in an ice bath. When the temperature had dropped to about 2° C. a solution of 2.35 g. of methyl glyoxal dissolved in 7 ml. of water containing 1 g. of sodium bisulfite is added all at once. The slurry is stirred for three hours in the ice bath. It is then diluted with 200 ml. of ice water and filtered. The precipitate is washed with warm water and dried. A yield of 1 g. of 2-amino-4-hydroxy-6-methylpyrimido[4,5-b]pyrazine is obtained.

*Example 3*

A solution of 600 g. of sodium sulfite in 1800 cc. of water is warmed slightly and the pH adjusted to 7 with concentrated hydrochloric acid. To this is added 42.8 g. of 2,4,5-triamino-6-hydroxypyrimidine dihydrochloride dissolved in a minimum amount of water and the pH again adjusted to 7. The mixture is warmed to 45° to 47° C. to get most of the material into solution. To this solution over a period of 10 minutes is added 47 cc. of 30.7% methyl glyoxal diluted to 100 cc. and containing 10 g. of sodium bisulfite. The mixture is stirred for one-half hour, the product filtered off and recrystallized from 2 N. sodium hydroxide. A yield of 27 g. of 2-amino-4-hydroxy-6-methylpyrimido[4,5-b]pyrazine is obtained.

A solution of 200 mg. of the product obtained above in 20 ml. of water is prepared. To this is added 10 ml. of 2 N. potassium permanganate. The mixture is heated on a steam bath for three hours, following which 1 ml. more of potassium permanganate solution is added and the heating continued for 3 hours more. The maganese dioxide is filtered off and the filtrate made acid with acetic acid. The product obtained is 2-amino-4-hydroxypyrimido[4,5-b]pyrazine-6-carboxylic acid, yield 144 mg.

The above experiment shows that the original process gives the desired 6-methyl pteridine since on oxidation the corresponding 6-carboxylic acid pteridine is obtained.

I claim:

1. A method of preparing 2-amino-4-hydroxy-6-methylpyrimido [4,5-b]pyrazine which comprises reacting 2,4,5-triamino-6-hydroxypyrimidine with methyl glyoxal in a substantially aqueous solvent in the presence of the $SO_3^-$ ion and at a pH less than 8.5.

2. A method of preparing 2-amino-4-hydroxy-6-methylpyrimido [4,5-b]pyrazine which comprises reacting 2,4,5-triamino-6-hydroxypyrimidine with methyl glyoxal in the presence of a substantially aqueous solvent and a member of the group consisting of alkali metal and alkaline earth metal sulfites and bisulfites at a pH less than 8.5.

3. A method of preparing 2-amino-4-hydroxy-6-methylpyrimido [4,5-b]pyrazine which comprises reacting 2,4,5-triamino-6-hydroxypyrimidine with methyl glyoxal in the presence of a substantially aqueous solvent and an alkali metal sulfite at a pH not greater than 8.5.

4. A method of preparing 2-amino-4-hydroxy-6-methylpyrimido [4,5-b]pyrazine which comprises reacting 2,4,5-triamino-6-hydroxypyrimidine with methyl glyoxal in the presence of a substantially aqueous solvent and sodium sulfite at a pH less than 8.5.

5. A method of preparing 2-amino-4-hydroxy-6-methylpyrimido [4,5-b]pyrazine which comprises reacting 2,4,5-triamino-6-hydroxypyrimidine with methyl glyoxal in the presence of a substantially aqueous solvent and potassium sulfite at a pH less than 8.5.

6. A method of preparing 2-amino-4-hydroxy-6-methylpyrimido [4,5-b]pyrazine which comprises reacting 2,4,5-triamino-6-hydroxypyrimidine with methyl glyoxal in the presence of a substantially aqueous solvent and ammonium sulfite at a pH less than 8.5.

JOSEPH SEMB.

No references cited.